United States Patent
Lu et al.

US007958465B2
US 7,958,465 B2
Jun. 7, 2011

(12) United States Patent
(10) Patent No.: US 7,958,465 B2
(45) Date of Patent: Jun. 7, 2011

(54) DUMMY PATTERN DESIGN FOR REDUCING DEVICE PERFORMANCE DRIFT

(75) Inventors: Lee-Chung Lu, Taipei (TW); Chien-Chih Kuo, Hsin-Chu (TW); Jian-Yi Li, Hsin-Chu (TW); Sheng-Jier Yang, Zhubei (TW)

(73) Assignee: Taiwan Semiconductor Manufacturing Company, Ltd., Hsin-Chu (TW)

( * ) Notice: Subject to any disclaimer, the term of this patent is extended or adjusted under 35 U.S.C. 154(b) by 346 days.

(21) Appl. No.: 12/211,503

(22) Filed: Sep. 16, 2008

(65) Prior Publication Data

US 2009/0282374 A1 Nov. 12, 2009

Related U.S. Application Data

(60) Provisional application No. 61/051,460, filed on May 8, 2008.

(51) Int. Cl.
*G06F 17/50* (2006.01)
*G06F 19/00* (2011.01)
(52) U.S. Cl. ........... 716/55; 716/119; 716/126; 716/132
(58) Field of Classification Search .................... 716/21, 716/9, 10, 12, 13, 2, 55, 119, 126, 132
See application file for complete search history.

(56) References Cited

U.S. PATENT DOCUMENTS

| 5,278,105 | A | 1/1994 | Eden et al. |
| 6,281,049 | B1 | 8/2001 | Lee |
| 6,284,626 | B1 | 9/2001 | Kim |
| 6,984,564 | B1 | 1/2006 | Huang et al. |
| 7,119,404 | B2 | 10/2006 | Chang et al. |
| 7,164,163 | B2 | 1/2007 | Chen et al. |
| 7,232,730 | B2 | 6/2007 | Chen et al. |
| 7,484,198 | B2* | 1/2009 | Lin et al. .......... 716/10 |
| 7,600,207 | B2* | 10/2009 | Moroz et al. .......... 716/11 |
| 7,767,515 | B2* | 8/2010 | Moroz et al. .......... 438/221 |
| 2007/0204250 | A1* | 8/2007 | Moroz et al. .......... 716/10 |
| 2009/0007043 | A1* | 1/2009 | Lin et al. .......... 716/9 |
| 2009/0313595 | A1* | 12/2009 | Moroz et al. .......... 716/10 |

FOREIGN PATENT DOCUMENTS

JP 2001-332706 11/2001

OTHER PUBLICATIONS

Hall et al., "Impact of Via Interactions and Metal Slotting on Stress Induced Voiding", IEEE International Reliability Physics Symposium, Apr. 27 to May 1, 2008, pp. 392-398.*
Topaloglu, "Standard Cell and Custom Circuit Optimization using Dummy Diffusions Through STI Width Stress Effect Utilization", IEEE Custom Integrated Circuits Conference, Sep. 16-19, 2007, pp. 619-622.*

* cited by examiner

*Primary Examiner* — Phallaka Kik
(74) *Attorney, Agent, or Firm* — Slater & Matsil, L.L.P.

(57) ABSTRACT

A method of forming an integrated circuit structure on a chip includes extracting an active pattern including a diffusion region; enlarging the active pattern to form a dummy-forbidden region having a first edge and a second edge perpendicular to each other; and adding stress-blocking dummy diffusion regions throughout the chip, which includes adding a first stress-blocking dummy diffusion region adjacent and substantially parallel to the first edge of the dummy-forbidden region; and adding a second stress-blocking dummy diffusion region adjacent and substantially parallel to the second edge of the dummy-forbidden region. The method further includes, after the step of adding the stress-blocking dummy diffusion regions throughout the chip, adding general dummy diffusion regions into remaining spacings of the chip.

20 Claims, 7 Drawing Sheets

DUMMY PATTERN DESIGN FOR REDUCING DEVICE PERFORMANCE DRIFT

This application claims the benefit of U.S. Provisional Patent Application Ser. No. 61/051,460, filed May 8, 2008, and entitled "Dummy Patterns in Semiconductor Process," which application is hereby incorporated herein by reference.

TECHNICAL FIELD

This invention relates generally to integrated circuits, and more particularly to metal-oxide-semiconductor (MOS) devices, and even more particularly to a dummy pattern design for reducing the performance drift of the MOS devices caused by differences in stresses applied on the MOS devices.

BACKGROUND

It is well known that the drive currents of metal-oxide-semiconductor (MOS) devices are affected by the stresses applied on their channel regions. The stresses in the channel regions may improve the carrier mobility. Generally, it is desirable to induce a tensile stress in the channel region of an n-type MOS (NMOS) device, and to induce a compressive stress in the channel region of a p-type MOS (PMOS) device.

Although the beneficial stresses in the channel regions are generally desirable, it is also realized that the magnitude of the drive current improvement is related to the magnitude of the stress. On a same semiconductor chip, the MOS devices may be applied with stresses having different magnitudes. Accordingly, the drive current improvements for different MOS devices may be different, resulting in non-uniform drive currents, and hence non-uniform drive current drifts.

The performance of MOS devices needs to be predictable, so that at circuit design time, simulations may accurately reflect the circuit behavior. Accordingly, it is preferred that in a semiconductor chip at least the MOS devices of a same type and in a same type of circuits have a uniform performance. However, with the non-uniform drive current drift, during the simulations of the circuit design, the drive current drift has to be compensated for. What makes the compensation of the drive current drift complicated is that the stresses of MOS devices are affected by various factors and those factors behave differently for different layouts.

Figure 1:
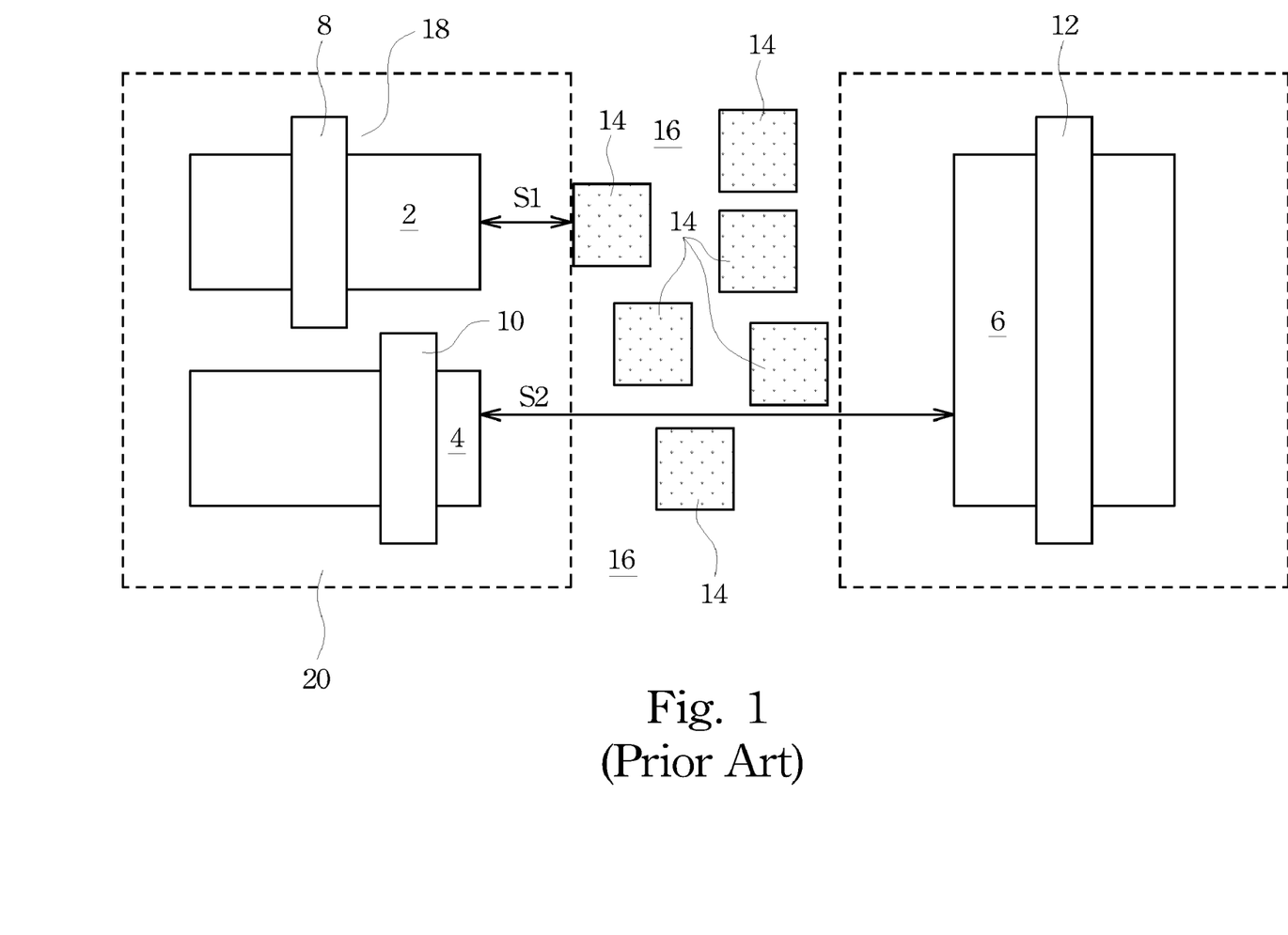
FIG. 1 illustrates a conventional layout of an integrated circuit having dummy active regions.

Conventional integrated circuit designs, however, often neglected such an issue. For example, U.S. Pat. No. 5,278,105 provides a method for adding dummy regions. The method includes extracting layouts of active layers, forming blocked regions including the patterns of the active layers, and laying out dummy patterns in regions other than the blocked regions. FIG. 1 illustrates a possible layout including active regions 2, 4 and 6, gate electrode strips 8, 10 and 12, and dummy active regions 14. Active region 2 and the overlying gate electrode strip 8 belong to MOS device 18, while active region 4 and the overlying gate electrode strip 10 belong to MOS device 20. It is noted that one of the dummy active regions 14 is spaced apart from active region 2 by spacing S1. Accordingly, the paths for applying stress (referred to as stress-application paths hereinafter) by STI regions 16 have a length S1. On the other hand, along another stress-application path, the stress-application path may have length S2. The significant difference in the lengths of the stress-application paths results in a large variation in the stresses applied by STI regions 16, and hence in a significant variation in the performance (for example, drive currents) of MOS devices 18 and 20. For example, with a greater stress-application length S2, STI regions 16 may apply a greater stress to the channel region of MOS device 20 than the stress applied to the channel region of MOS device 18. The device drive current drift between MOS devices 18 and 20 may reach about 10 to 20 percent. Accordingly, new methods for reducing the drive current drifts of MOS devices are needed.

SUMMARY OF THE INVENTION

In accordance with one aspect of the present invention, a method of forming an integrated circuit structure on a chip includes extracting an active layer from a design of the integrated circuit structure. The active layer includes an active pattern. The active pattern includes a diffusion region having a first length and a first width. The method further includes enlarging the active pattern to form a dummy-forbidden region having a first edge and a second edge perpendicular to each other; adding stress-blocking dummy diffusion regions throughout the chip, which includes adding a first stress-blocking dummy diffusion region adjacent and substantially parallel to the first edge of the dummy-forbidden region, wherein the first stress-blocking dummy diffusion region has a second length no less than about the first length of the active pattern; and adding a second stress-blocking dummy diffusion region adjacent and substantially parallel to the second edge of the dummy-forbidden region, wherein the second stress-blocking dummy diffusion region has a third length no less than about the first width of the active pattern. The method further includes, after the step of adding the stress-blocking dummy diffusion regions throughout the chip, adding general dummy diffusion regions into remaining spacings of the chip.

In accordance with another aspect of the present invention, a method of forming an integrated circuit structure on a chip includes extracting an active layer from a design of the integrated circuit structure. The active layer includes a target diffusion region including a first edge and a second edge perpendicular to each other; and a gate electrode strip over the target diffusion region and parallel to the first edge. The method further includes enlarging the target diffusion region to form a dummy-forbidden region including a third edge substantially parallel to the first edge; and a fourth edge substantially parallel to the second edge. The method further includes adding stress-blocking dummy diffusion regions throughout the chip including adding a first stress-blocking dummy diffusion region outside the dummy-forbidden region and adjoining the third edge, wherein the first stress-blocking dummy diffusion region has a first lengthwise dimension no less than about a length of the first edge, and wherein the first lengthwise dimension is substantially aligned to, and parallel to, the first edge; and adding a second stress-blocking dummy diffusion region outside the dummy-forbidden region and adjoining the fourth edge. The second stress-blocking dummy diffusion region has a second lengthwise dimension no less than about a length of the second edge. The second lengthwise dimension is substantially aligned to, and parallel to, the second edge.

In accordance with yet another aspect of the present invention, a method of forming an integrated circuit structure on a chip includes providing a target diffusion region including a first edge having a first length; and a second edge perpendicular to the first edge, wherein the first and the second edges are perpendicular to each other. The method further includes adding a first stress-blocking dummy diffusion region adjacent to, and spaced apart from, the first edge with no dummy diffusion regions therebetween. The first stress-blocking dummy diffusion region has a first lengthwise dimension substantially no less than the first length. The method further includes adding a second stress-blocking dummy diffusion region adjacent to, and spaced apart from, the second edge with no dummy diffusion regions therebetween. The second stress-blocking dummy diffusion region has a second lengthwise dimension substantially no less than the second length. The first and the second lengthwise dimensions are in perpendicular directions.

In accordance with yet another aspect of the present invention, an integrated circuit structure includes a target diffusion region including a first edge having a first length; and a second edge having a second length, wherein the first and the second edges are substantially perpendicular to each other. The integrated circuit structure further includes a first stress-blocking dummy diffusion region adjacent to, and spaced apart from, the first edge with no dummy diffusion regions therebetween. The first stress-blocking dummy diffusion region has a first lengthwise dimension substantially no less than about the first length. The integrated circuit structure further includes a second stress-blocking dummy diffusion region adjacent to, and spaced apart from, the second edge with no dummy diffusion regions therebetween. The second stress-blocking dummy diffusion region has a second lengthwise dimension substantially no less than about the second length. The first and the second lengthwise dimensions are in perpendicular directions.

In accordance with yet another aspect of the present invention, an integrated circuit structure includes a target diffusion region including a first edge having a first length; a second edge having a second length; a third edge having a third length, wherein the first and the third edges are substantially parallel; and a fourth edge having a fourth length, wherein the second and the fourth edges are substantially parallel, and are substantially perpendicular to the first and the third edges. The integrated circuit structure further includes a gate electrode over the target diffusion region; four stress-blocking dummy diffusion strips, each being adjacent to one of the first, the second, the third, and the fourth edges with no dummy diffusion regions between the four stress-blocking dummy diffusion strips and the target diffusion region. Each of the four stress-blocking dummy diffusion strips has a length substantially no less than about a length of a respective nearest edge of the target diffusion region. The integrated circuit structure further includes a plurality of general dummy diffusion regions spaced apart from the target diffusion region by the four stress-blocking dummy diffusion regions.

The advantageous features of the present invention include added dummy diffusion regions for blocking stress-application paths, and hence the variations in the stresses applied to MOS devices are reduced.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

A method for inserting dummy patterns into layouts of integrated circuits is provided. The intermediate stages of the method are provided, and the variations of the method are also discussed. Throughout the various views and illustrative embodiments of the present invention, like reference numbers are used to designate like elements.

For each of the MOS devices in a semiconductor chip, the respective spacings from other MOS devices affect its performance. The spacings may be filled with shallow trench isolation (STI) regions (or field regions). Due to the inherent stress of the insulation materials, the STI regions apply stresses to adjacent MOS devices, and the magnitudes of the stresses are affected by the spacings. The variations in the spacings cause variations in the stresses generated by STI regions. Therefore, it is difficult to predict and compensate for the drive current drifts in circuit simulations. Embodiments of the present invention are thus used to reduce the variations in the stresses.

Figure 2:
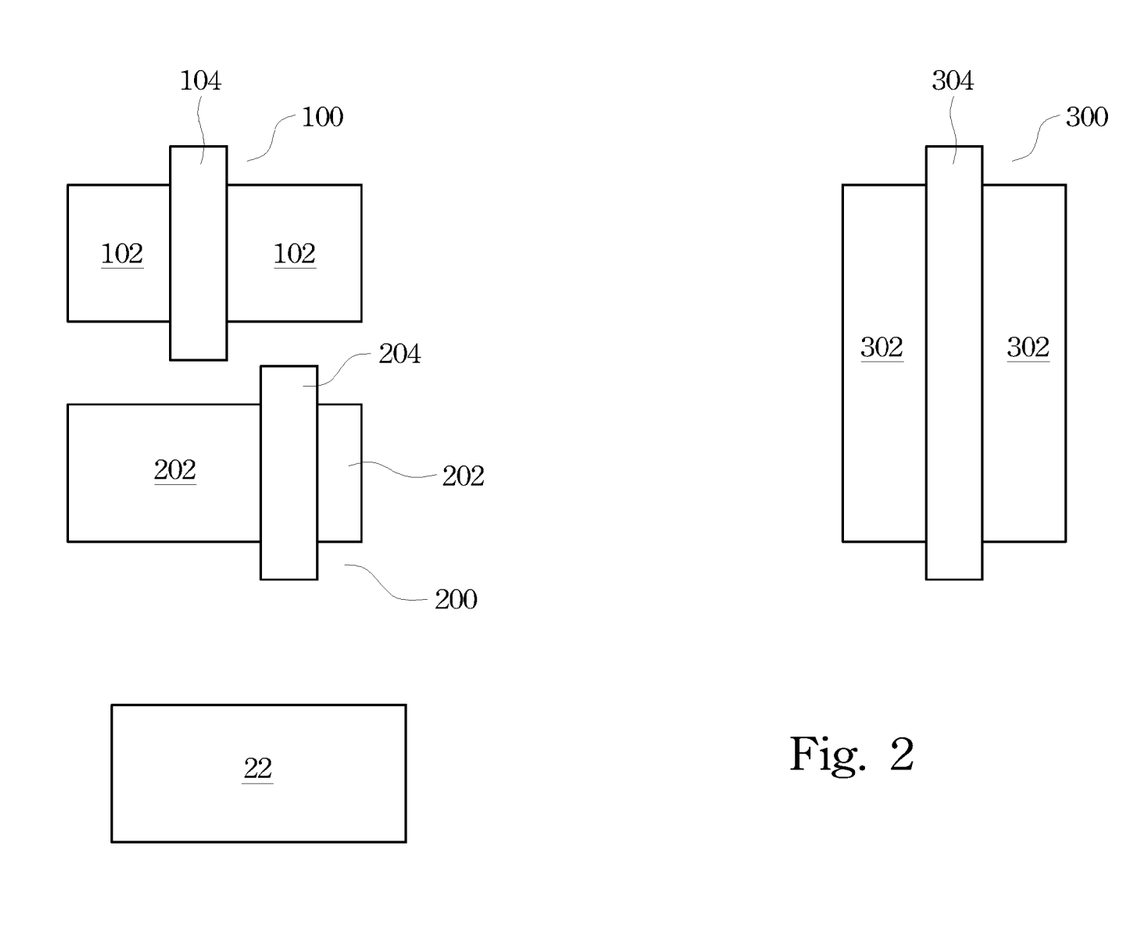
FIGS. 2 through 6 are top views of intermediate stages in a method for adding dummy diffusion regions.

Referring to FIG. 2, an integrated circuit design is provided. Active layers are first extracted from the layout of the integrated circuit. The active layers may include the layer of active regions (also referred to as diffusion regions throughout the description, which may be used for forming source and drain regions), the layer of polysilicon strips, and/or the layers of metals. Any other layers in the layout that may affect the placement of dummy patterns may also be extracted as part of the active layers. FIG. 2 schematically shows the extracted diffusion regions 102, 202 and 302, and polysilicon strips 104, 204 and 304. Diffusion regions 102, 202 and 302 form MOS devices 100, 200, and 300 with polysilicon strips 104, 204 and 304, respectively. Throughout the description, the diffusion regions, such as 102, 202 and 302, that form MOS devices with overlying gate electrodes are referred to as being "target diffusion regions." Conversely, the diffusion regions, such as diffusion region 22, that do not form MOS devices are referred to as non-target diffusion regions. One skilled in the art will realize that although the terms "polysilicon" or "poly" are used, gate strips 104, 204 and 304 may be formed of materials other than polysilicon, such as metals, metal silicides, metal nitrides, polysilicon, and combinations thereof.

Figure 3:
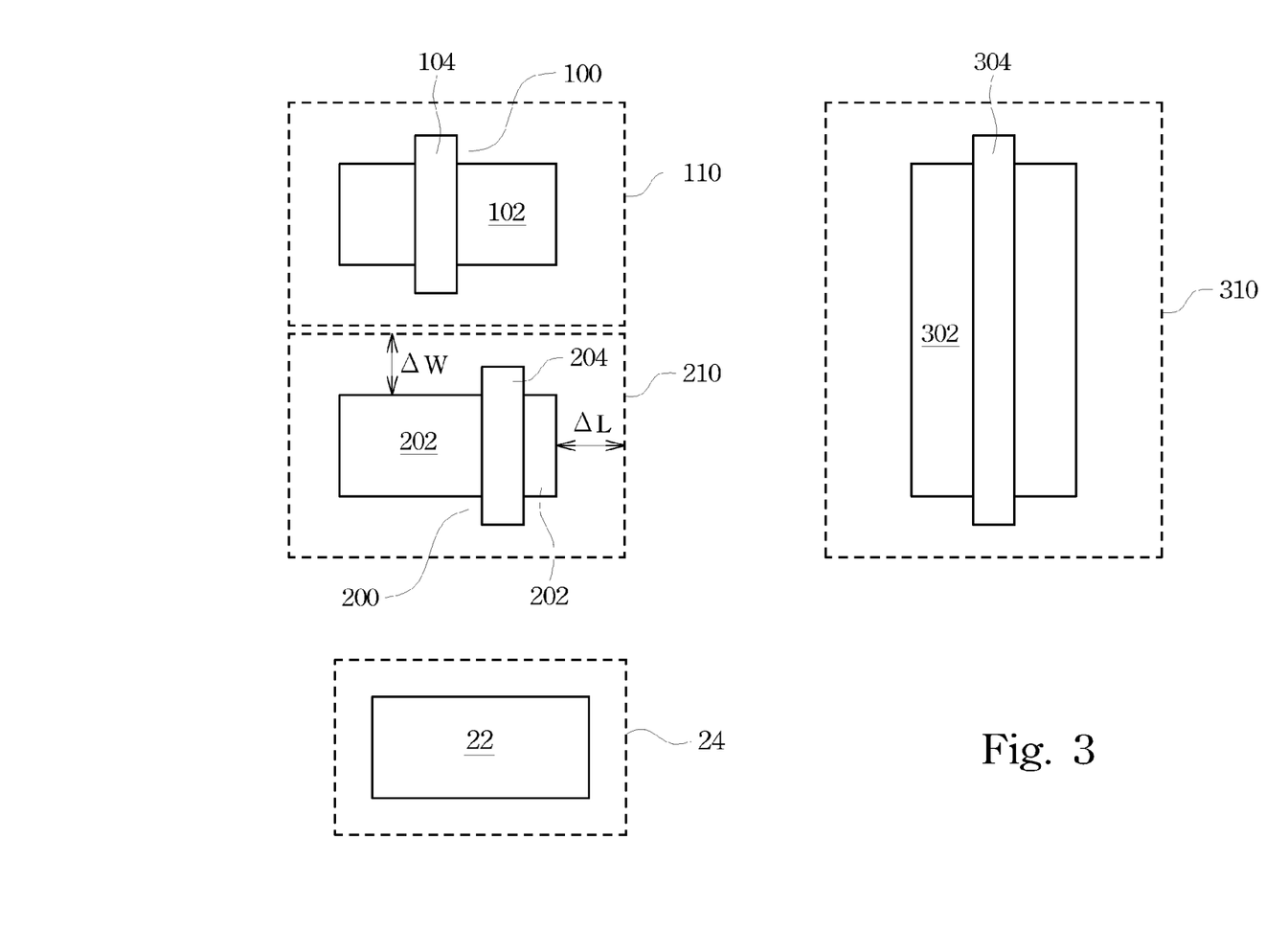

Referring to FIG. 3, a sizing operation is performed to form dummy-forbidden regions 110, 210, 310, and 24. The dummy-forbidden regions may be formed by enlarging diffusion regions 102, 202, 302, and 22. In the sizing operation, all of the diffusion regions on the same semiconductor chip are preferably enlarged to form dummy-forbidden regions. In an embodiment, the sizing operation is performed by increasing the widths and lengths of diffusion regions by a certain factor, such as about 5 percent to about 50 percent. In alternative embodiments, the widths and lengths of the diffusion regions are increased on each side by a designated length $\Delta L$ and/or a designated width $\Delta W$, wherein the designated length $\Delta L$ and the designated width $\Delta W$ may be related to the specific technology for forming the integrated circuits. In an exemplary embodiment, the designated length $\Delta L$ and the designated width $\Delta W$ are about 0.1 μm.

In alternative embodiments, both diffusion regions 102, 202, 302, and 22 and polysilicon strips 104, 204 and 304 are enlarged to form dummy-forbidden regions. Accordingly, the respective dummy-forbidden regions may be larger than the illustrated dummy-forbidden regions 110, 210, 310, and 24.

Figure 4A:
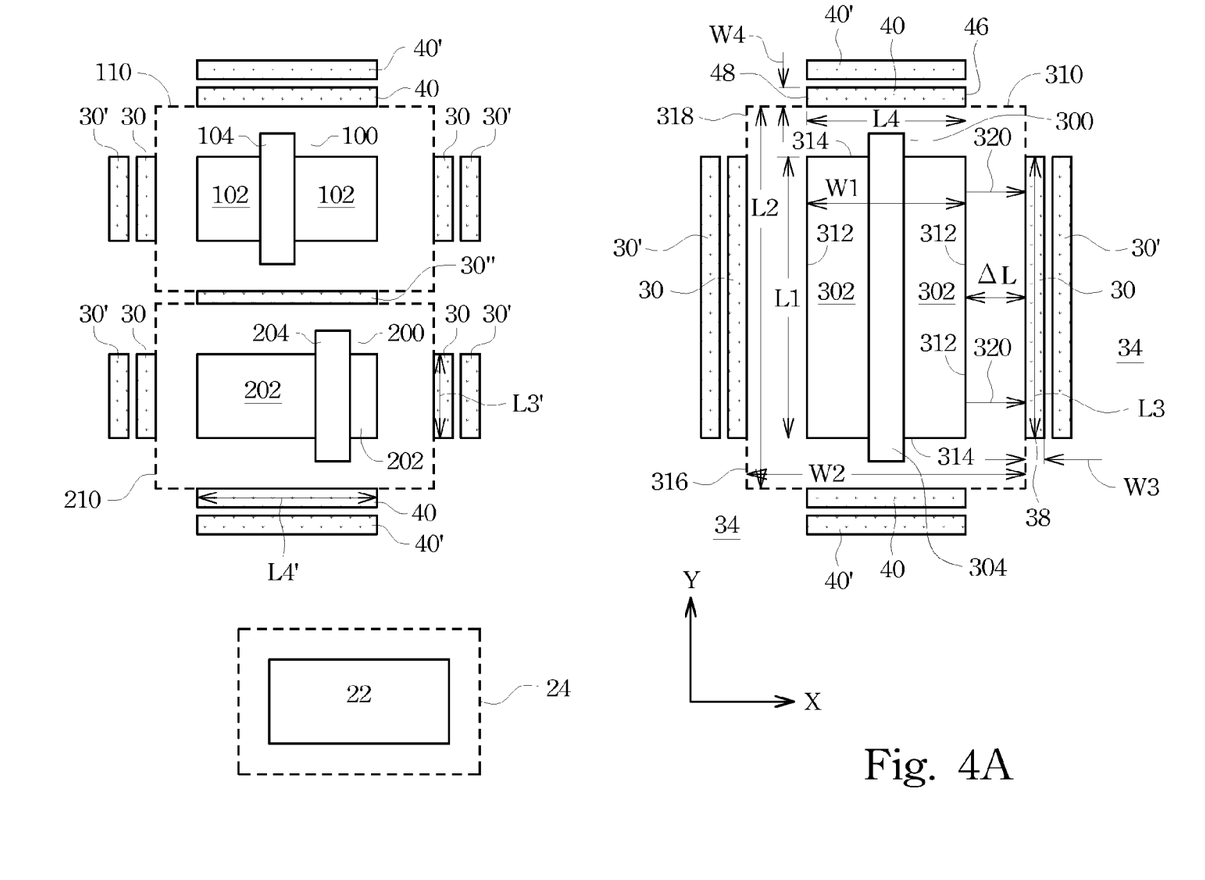

FIG. 4A illustrates the addition (insertion) of stress-blocking dummy diffusion regions 30, 30', 40, and 40'. For simplicity, the stress-blocking dummy diffusion regions 30 and 40 surrounding target diffusion region 302 are discussed in detail to explain the concept of the present invention. However, the same teaching may be applied to other target diffusion regions including target diffusion regions 102 and 202. The stress-blocking dummy diffusion regions are also referred to as stress-blocking regions throughout the description. Diffusion region 302 has edges 312 and 314, wherein edges 312 have a length L1, and edges 314 have a width W1. Dummy-forbidden region 310 has edges 316 and 318, wherein edges 316 have a length L2, and edges 318 have a width W2. In the preferred embodiment, stress-blocking regions 30 are formed outside of, and adjacent to (and preferably adjoining), edges 316 of dummy-forbidden region 310. Stress-blocking regions 30 have the function of limiting the lengths of paths (referred to as stress-application paths hereinafter) of the stresses applied by STI regions 34, which surround diffusion regions 102, 202, and 302. The limited distance ΔL between diffusion region 302 and stress-blocking regions 30 puts a limit on the magnitude of the stress that can be applied by STI region 34. Stress-blocking regions 30 thus cap the stresses applied by STI regions 34 in the X-direction. For example, the stress-application paths are illustrated by arrows 320 starting from edge 312 and extending in the direction perpendicular to the lengthwise direction of polysilicon strip 304. It is noted that arrows 320 are blocked by one of the stress-blocking regions 30. Throughout the description, the term "lengthwise direction" indicates the direction of the longer side of stress-blocking region 30, and the term "lengthwise dimension" indicates the dimension of the longer side.

To effectively block the stress-application paths in the gate-length direction of MOS device 300 (X-direction), stress-blocking region 30 is preferably aligned to the respective edge 312 of diffusion region 302, with both ends 36 and 38 at least substantially aligned to the respective edges 314 of diffusion region 302. More preferably, ends 36 and 38 extend beyond the respective edges 314 of diffusion region 302. Accordingly, the length L3 of stress-blocking regions 30 is preferably substantially equal to, or greater than, the length L1 of diffusion region 302, although it may be slightly less than length L1. For example, length L3 may be between about 80 percent and about 100 percent of L1. However, reducing length L3 to less than L1 may adversely affect the stress-blocking effect.

The length L3 of stress-blocking regions 30 and length L4 of stress-blocking regions 40 are related to the length L1 and width W1 of diffusion region 302, respectively. It is realized that on a same chip, other target diffusion regions may have different lengths and/or widths than diffusion region 302, Therefore, the lengths (and widths) of stress-blocking regions 30 or 40 adjacent different target diffusion regions may be equal to, or different from, each other. In an exemplary embodiment, length L3 is different from length L3' of the stress-blocking regions 30 adjacent diffusion region 202, and/or length L4 is different from length L4' of the stress-blocking regions 40 adjacent diffusion region 202.

Similarly, stress-blocking regions 40 are added to block the stress-application paths in the gate width direction (Y direction in FIG. 4A). Accordingly, stress-blocking regions 40 are preferably aligned to edges 314 of diffusion region 302, with both ends 46 and 48 at least substantially aligned to the respective edges 314 of diffusion region 302. More preferably, ends 46 and 48 extend beyond the respective edges 312 of diffusion region 302. The length L4 of stress-blocking regions 30 is preferably substantially equal to, or greater than, the width W1 of diffusion region 302, although it may be slightly less than width W1, for example, being between about 80 percent and about 100 percent of width W1. Lengths L3 and L4 may be equal to, or different from, each other.

Preferably, the addition of dummy regions 30 and 40 does not cause the adverse increase in local density of diffusion regions to increase too much. Therefore, dummy regions 30 and 40 are preferably formed as strips, with lengthwise directions parallel to the respective adjacent (or adjoining) edges of dummy-forbidden region 310. Accordingly, the widths W3 and W4 are smaller than lengths L3 and L4, respectively. In an exemplary embodiment, widths W3 and W4 are less than about 25 percent of the respective lengths L3 and L4. Further, it is noted that the lengthwise directions of stress-blocking regions 30 and 40 are substantially perpendicular to each other. Preferably, on each of the all four sides of diffusion region 302, a stress-blocking region 30/40 is formed.

Throughout the semiconductor chip, stress-blocking regions 30/40 are preferably formed for all target diffusion regions. In alternative embodiments, stress-blocking regions are formed only adjacent to all target diffusion regions of analog MOS devices, while substantially no stress-blocking regions are formed adjacent target diffusion regions of digital MOS devices. Further, preferably, no stress-blocking regions are formed around non-target diffusion regions (for example, non-target diffusion region 22), although stress-blocking regions can be formed around the non-target diffusion regions.

Figure 4B:
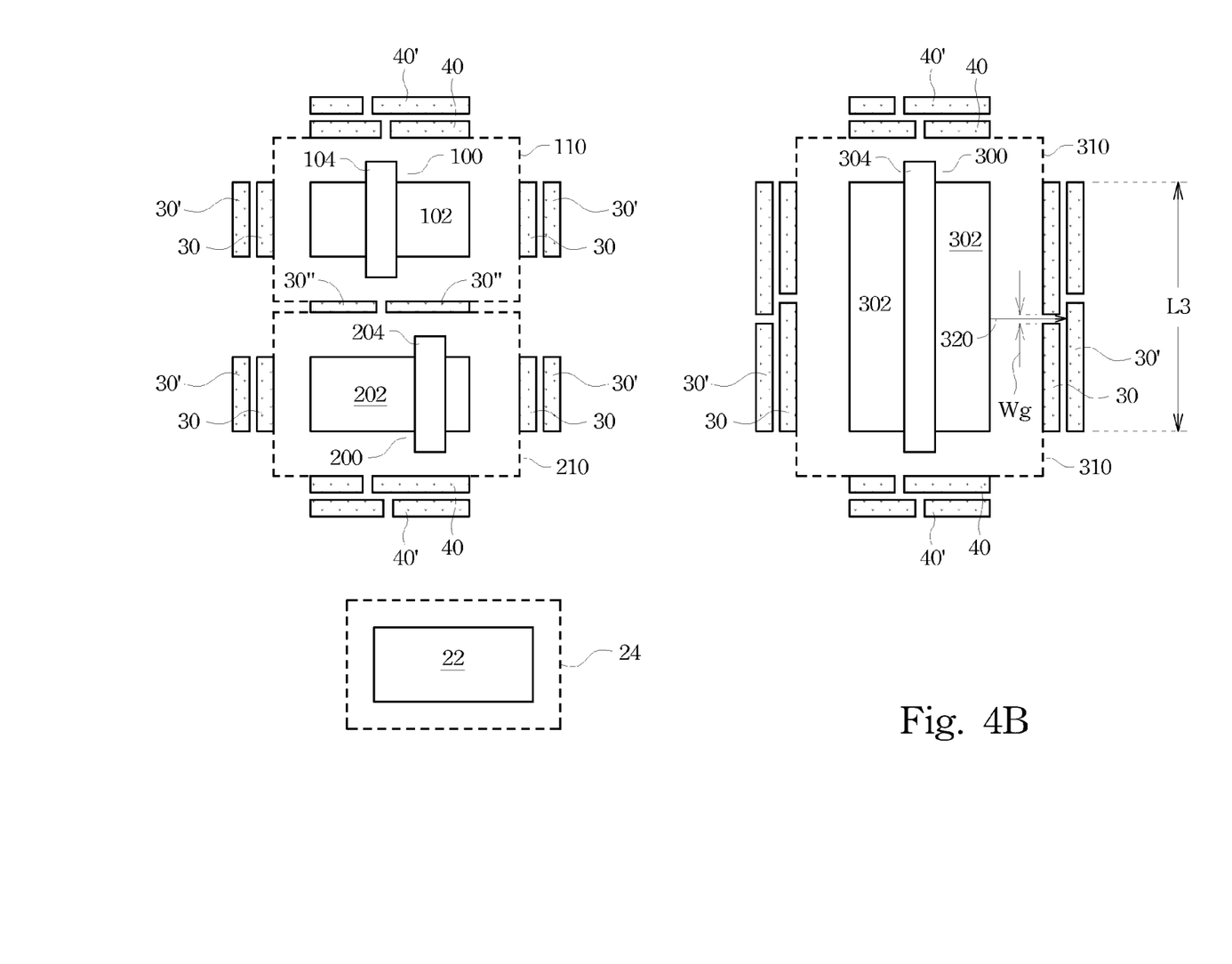

Referring to FIG. 4B, in the case length L3 is greater than desirable, each of the stress-blocking regions 30 and 40 may be divided into two or more sub regions, partially due to process reasons. The spacings between the sub regions are preferably small, for example, with widths Wg between about 0.08 μm and about 0.2 μm. More preferably, widths Wg are less than about 25 percent of length L3. In an exemplary embodiment, widths Wg are about 0.1 μm. Although stress-application path 320 may pass through the spacings between the sub regions, since widths Wg are small, the adverse increase in the applied stresses is not significant. Further, additional stress-blocking regions, such as the ones marked as 30', may be added. Preferably, stress-blocking regions 30 and 30' are parallel to each other, with their spacings between sub regions mis-aligned. As a result, the stress-blocking paths through the spacings in stress-blocking region 30 are blocked by stress-blocking region 30'.

Figure 5:
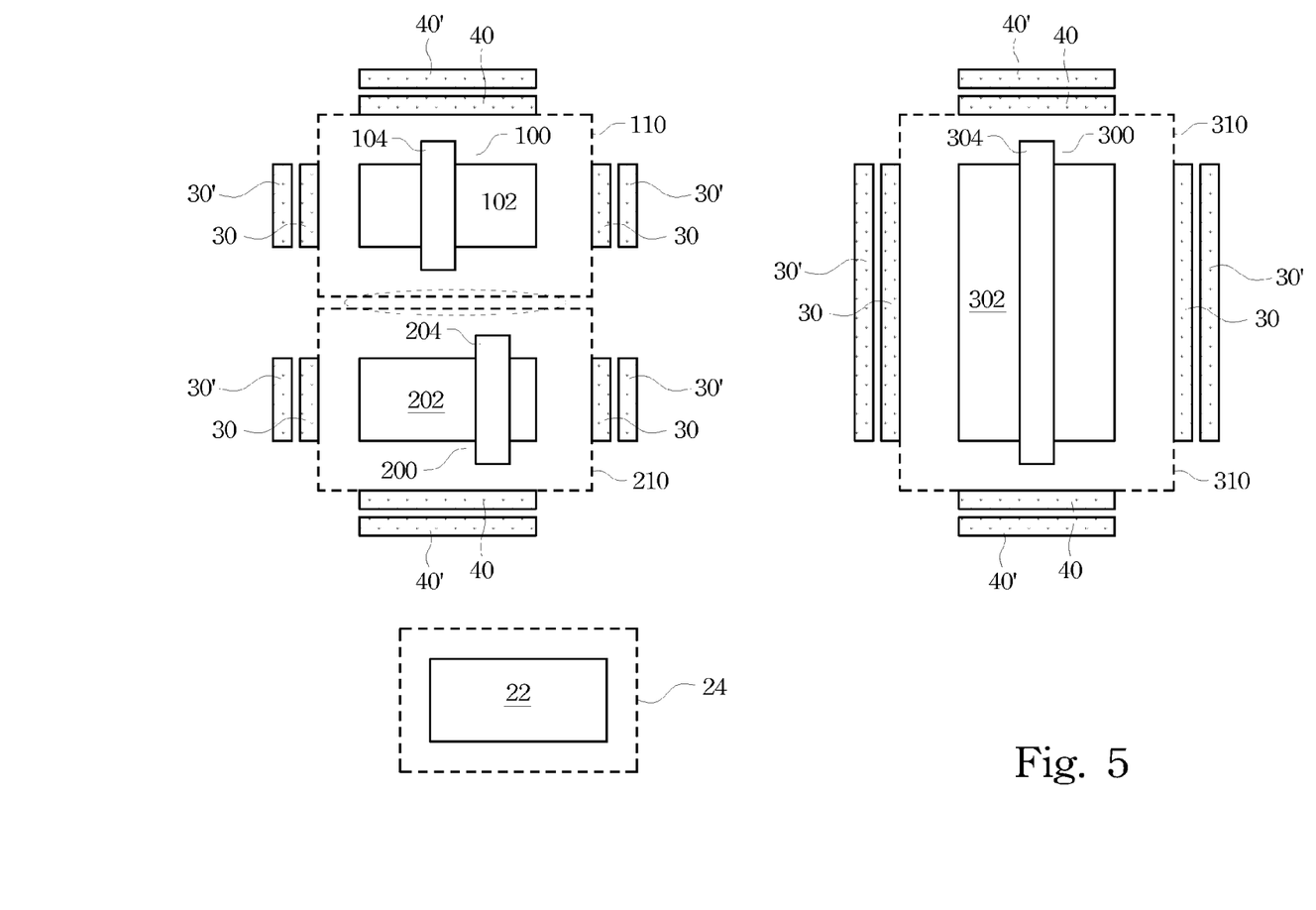

FIG. 5 illustrates a step for removing undesirable stress-blocking regions, which is preferably performed after all stress-blocking regions throughout a semiconductor chip have been added. The removed stress-blocking regions include those violating design rules, for example, the ones underlying polysilicon strips, the ones crossing n-well edges, and the like. The removal step may further include a smoothing operation to remove small dummy patterns, such as 30" as shown in FIGS. 4A and 4B. In FIG. 5, the region having stress-blocking region 30" removed is marked using a dashed ellipse.

Figure 6:
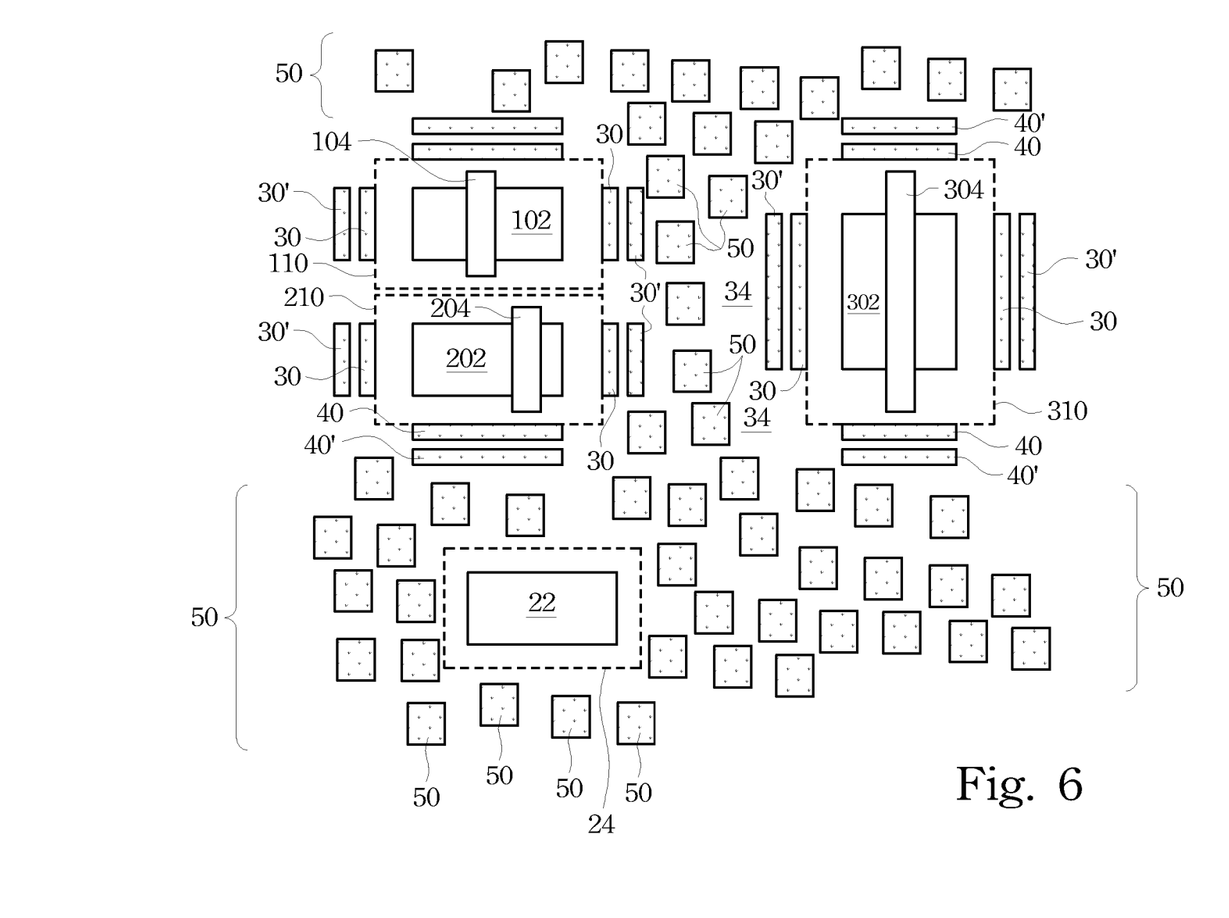

Referring to FIG. 6, additional dummy diffusion regions 50 (referred to as general dummy diffusion regions hereinafter) are added into the remaining spacings left by the existing patterns. The general dummy diffusion regions 50 are used to fill pattern scarce region, so that the diffusion regions (including dummy diffusion regions) throughout the entire chip (and entire wafer) is more uniform. Various algorithms may be used to determine the locations for adding general dummy diffusion regions 50. General dummy diffusion regions 50 may have a different shape and dimensions than stress-blocking regions 30 and 40. The spacings left unfilled will be for forming STI regions (or field oxides) 34. After dummy diffusion regions 50 are added, an additional removal step may be performed to remove undesirable dummy diffusion regions.

The embodiments of the present invention have several advantageous features. By adding stress-blocking regions 30/40 to block stress-application paths around MOS devices, the lengths of the stress-application paths, and hence the stresses applied by STI regions 34, are limited to vary in a small range. The stresses applied by STI regions throughout the semiconductor chip are thus more uniform. As a result, the device performance drift, such as drive current drift, is limited.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, and composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method of forming an integrated circuit structure on a chip, the method comprising:
    extracting an active layer from a design of the integrated circuit structure, wherein the active layer comprises an active pattern, and wherein the active pattern comprises a diffusion region having a first length and a first width;
    enlarging the active pattern to form a dummy-forbidden region having a first edge and a second edge perpendicular to each other;
    adding by using a computer stress-blocking dummy diffusion regions throughout the chip comprising:
        adding a first stress-blocking dummy diffusion region adjacent and substantially parallel to the first edge of the dummy-forbidden region, wherein the first stress-blocking dummy diffusion region has a second length no less than about the first length of the active pattern; and
        adding a second stress-blocking dummy diffusion region adjacent and substantially parallel to the second edge of the dummy-forbidden region, wherein the second stress-blocking dummy diffusion region has a third length no less than about the first width of the active pattern; and
    after the step of adding the stress-blocking dummy diffusion regions throughout the chip, adding general dummy diffusion regions into remaining spacings of the chip.

2. The method of claim 1, wherein lengthwise directions of the first and the second stress-blocking dummy diffusion regions are perpendicular to each other.

3. The method of claim 1, wherein the dummy-forbidden region further comprises a third edge and a fourth edge perpendicular to each other, and the step of adding the stress-blocking dummy diffusion regions throughout the chip further comprises:
    adding a third stress-blocking dummy diffusion region adjacent and substantially parallel to the third edge of the dummy-forbidden region, wherein the third stress-blocking dummy diffusion region has a fourth length no less than about the first length of the active pattern; and
    adding a fourth stress-blocking dummy diffusion region adjacent and substantially parallel to the fourth edge of the dummy-forbidden region, wherein the fourth stress-blocking dummy diffusion region has a fifth length no less than about the first width of the active pattern.

4. The method of claim 1 further comprising a dummy removal step between the step of adding the stress-blocking dummy diffusion regions throughout the chip and the step of adding the general dummy diffusion regions.

5. The method of claim 1, wherein the first stress-blocking dummy diffusion region comprises sub regions separated by spacings, wherein each of the spacings has a width smaller than about 25 percent of the second length.

6. The method of claim 5 further comprising forming an additional stress-blocking dummy diffusion region adjacent to, and parallel to, the first stress-blocking dummy diffusion region, wherein the additional stress-blocking dummy diffusion region comprises additional sub regions spaced apart from each other, and wherein the additional sub regions are mis-aligned to the sub regions.

7. The method of claim 1, wherein the active layer further comprises an additional active pattern comprising an additional diffusion region, and wherein the method further comprises:
    enlarging the additional active pattern to form an additional dummy-forbidden region; and
    forming an additional stress-blocking dummy diffusion region adjoining the additional dummy-forbidden region, wherein the additional stress-blocking dummy diffusion region is parallel to, and has a different length than, the first stress-blocking dummy diffusion region.

8. The method of claim 1, wherein, during the step of adding the stress-blocking dummy diffusion regions throughout the chip, stress-blocking dummy diffusion regions are added around active regions of analog MOS devices, and substantially no stress-blocking dummy diffusion regions are added around active regions of digital MOS devices.

9. The method of claim 1, wherein the stress-blocking dummy diffusion regions are formed adjacent to substantially all target diffusion regions of all analog MOS devices on the chip, and wherein substantially none of the stress-blocking dummy diffusion regions are formed adjacent to substantially all target diffusion regions of digital MOS devices on the chip.

10. A method of forming an integrated circuit structure on a chip, the method comprising:
    extracting an active layer from a design of the integrated circuit structure, wherein the active layer comprises:
        a target diffusion region comprising a first edge and a second edge perpendicular to each other; and
        a gate electrode strip over the target diffusion region and parallel to the first edge;
    enlarging the target diffusion region to form a dummy-forbidden region comprising:
        a third edge substantially parallel to the first edge; and
        a fourth edge substantially parallel to the second edge; and
    adding by using a computer stress-blocking dummy diffusion regions throughout the chip comprising:
        adding a first stress-blocking dummy diffusion region outside the dummy-forbidden region and adjoining the third edge, wherein the first stress-blocking dummy diffusion region has a first lengthwise dimension no less than about a length of the first edge, and wherein the first lengthwise dimension is substantially aligned to, and parallel to, the first edge; and adding a second stress-blocking dummy diffusion region outside the dummy-forbidden region and adjoining the fourth edge, wherein the second stress-blocking dummy diffusion region has a second lengthwise dimension no less than about a length of the second edge, and wherein the second lengthwise dimension is substantially aligned to, and parallel to, the second edge.

11. The method of claim 10 further comprising, after the step of adding the stress-blocking dummy diffusion regions throughout the chip, adding general dummy diffusion regions into remaining spacings of the chip.

12. The method of claim 11 further comprising, between the step of adding the stress-blocking dummy diffusion regions and the step of adding the general dummy diffusion regions, removing portions of the stress-blocking dummy diffusion regions.

13. The method of claim 10, wherein the active layer further comprises a non-target diffusion region, and wherein during the step of adding the stress-blocking dummy diffusion regions throughout the chip, no stress-blocking dummy diffusion regions are added adjacent to the non-target diffusion region.

14. The method of claim 10, wherein the first stress-blocking dummy diffusion region comprises sub regions separated by spacings, wherein each of the spacings has a width smaller than about 25 percent of the first lengthwise dimension.

15. The method of claim 10, wherein the first lengthwise dimension of the first stress-blocking dummy diffusion region is different from the second lengthwise dimension of the second stress-blocking dummy diffusion region.

16. The method of claim 10, wherein the first and the second lengthwise directions are perpendicular to each other.

17. A method of forming an integrated circuit structure on a chip, the method comprising:

providing a target diffusion region comprising:
a first edge having a first length; and
a second edge having a second length perpendicular to the first edge, wherein the first and the second edges are perpendicular to each other;

adding by using a computer a first stress-blocking dummy diffusion region adjacent to, and spaced apart from, the first edge with no dummy diffusion regions therebetween, wherein the first stress-blocking dummy diffusion region has a first lengthwise dimension substantially no less than the first length; and adding by using a computer a second stress-blocking dummy diffusion region adjacent to, and spaced apart from, the second edge with no dummy diffusion regions therebetween, wherein the second stress-blocking dummy diffusion region has a second lengthwise dimension substantially no less than the second length, and wherein the first and the second lengthwise dimensions are in perpendicular directions.

18. The method of claim 17, wherein the first and the second lengthwise dimensions are different from each other.

19. The method of claim 17 further comprising:
after the steps of adding the first and the second stress-blocking dummy diffusion regions, performing a removal step to remove dummy diffusion regions throughout the chip; and
after the removal step, adding general dummy diffusion regions into remaining spacings of the chip.

20. The method of claim 19, wherein the general dummy diffusion regions have different dimensions than the first and the second stress-blocking dummy diffusion regions.

* * * * *